No. 760,607. PATENTED MAY 24, 1904.
W. S. & LE ROY C. BONSALL.
FOOD WARMER.
APPLICATION FILED DEC. 16, 1902.
NO MODEL.
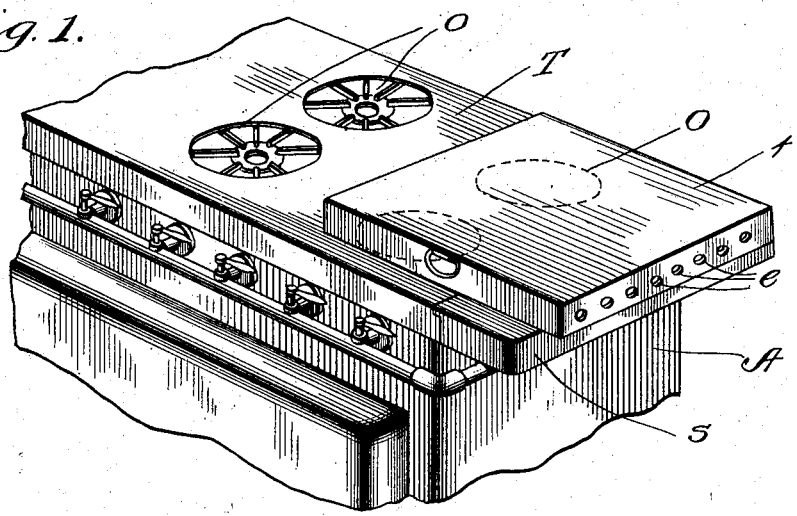
Fig. 1.
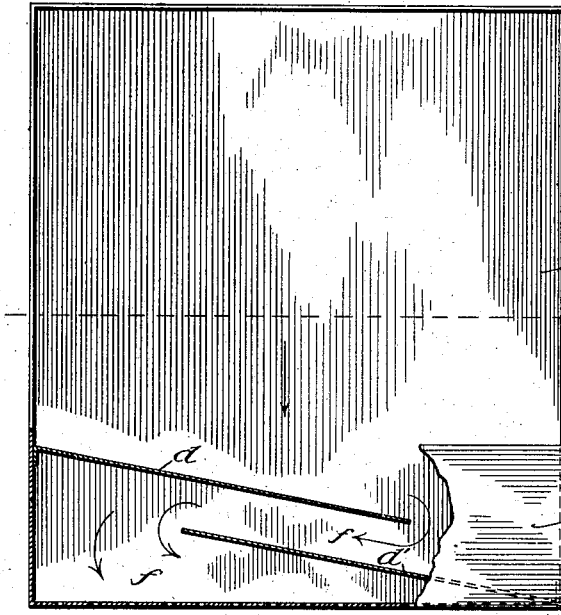
Fig. 2.
Fig. 3.
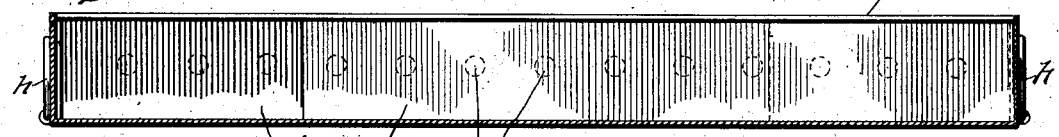
WITNESSES: INVENTORS.

No. 760,607. Patented May 24, 1904.

UNITED STATES PATENT OFFICE.

WILLIAM S. BONSALL AND LE ROY C. BONSALL, OF PHILADELPHIA, PENNSYLVANIA.

FOOD-WARMER.

SPECIFICATION forming part of Letters Patent No. 760,607, dated May 24, 1904.

Application filed December 16, 1902. Serial No. 135,401. (No model.)

*To all whom it may concern:*

Be it known that we, WILLIAM S. BONSALL and LE ROY C. BONSALL, citizens of the United States, residing at Philadelphia, in the county of Philadelphia and Commonwealth of Pennsylvania, have invented a new and useful utensil which we call a "Food-Warmer," for use in connection with cooking-stoves, and especially those stoves using oil, gas, or other vapor as a fuel, of which the following is a specification.

Our invention relates to that class of utensils intended to economize and utilize the heat otherwise wasted and to increase the heating-surface of the stove.

The object of our invention is to facilitate the keeping of articles of food warm after they have been cooked on an oil, gas, or other vapor stove while the burners are in use for cooking other articles. The difficulty to be overcome is that without some such device the articles first cooked grow cold while others are cooking unless served immediately. We are aware that there are various devices on the market to accomplish this object; but we seek to accomplish it in a novel and better way and do so by a machine, box, or pan which we call a "food-warmer," by which an extended heated surface is secured without an additional consumption of fuel.

The accompanying drawings illustrate our invention, in which—

Figure 1 is a view in perspective of a portion of the top and sides of an ordinary gas-stove with the usual shelf or bracket attached to one side and with our food-warmer resting on the top of the stove and projecting over the side of the shelf while it still covers two heat-openings. Fig. 2 is a bottom plan view of our food-warmer turned upside down and having a portion of the bottom and one end broken off, so as to show part of the passage by which the heat passes from the burner or burners of the stove out through the apertures in the side. Fig. 3 is a longitudinal section of the food-warmer upside down, taken through dotted lines $x$ $x$ looking in the direction of the arrow in Fig. 2 from the open end toward the closed end and showing the diagonal metal strips running from either side part way across the pan and supporting the top and forming, with the top and bottom of the pan, a passage for the hot air.

Similar letters refer to similar parts throughout the several views.

A is the body of the gas or other stove. T is the top; O O, openings for burners; S, the detachable shelf; $f$ $f$, the heat-passage; $h$ $h$, handles of food-warmer; $t$, top of food-warmer; $b$, the bottom; $d$ $d'$, diagonal strips each extending about two-thirds of the distance across the pan from opposite sides.

$e$ represents a series of perforations in one side of the food-warmer.

The food-warmer is made of light sheet metal of a size suitable to the stove on which it is to be used, with low sides and only one-third of a bottom. The top $t$ is supported by the diagonal metal strips $d$ $d'$ between the top and bottom and extending about two-thirds of the way across the food-warmer from either side and in front of the perforations $e$. The use of the diagonal metal strips $d$ $d'$ is to form, with a portion of the top and bottom of the food-warmer, a heat-passage, so that the heated air is drawn through the perforations $e$ in the side, thoroughly warming the end farthest from the flame.

The use and operation of the food-warmer are readily seen by placing it on the stove in any position—*e. g.*, in the position shown in Fig. 1—when the heat from the burners covered by it will strike the top $t$ and being confined by the closed end, top, and sides of the pan and the top of the stove pass between the top $t$ and the bottom $b$, around the ends of the diagonal metal strips $d$ $d'$, through the passage formed by said strips and the top and bottom of the utensil, and finally out through the perforations $e$, thoroughly heating in its course the top of the pan, including that portion of the top extending over the shelf or bracket S, and so keeping anything resting thereon warm. The use of the portion of the bottom left is to enable the food-warmer to be pushed well off the top of the stove over the shelf and beyond it and still keep the heat from escaping, as it does in other devices for this purpose, thereby materially increasing the heating-surface of the stove.

What we claim as our invention, and desire to secure by Letters Patent, is—

1. A food-warmer, comprising a box or pan having an imperforate top and also having that portion of its bottom adjacent to one of its ends covered to provide a passage for the heat of a stove when the warmer is placed thereon, the end of the box or pan adjacent to the covered portion of the bottom being provided with a series of apertures for the exit of the heat, and diagonal strips arranged within the box or pan and projecting from opposite sides thereof in advance of said perforations to compel the heat in its passage through the box or pan to follow a circuitous path to effect its thorough distribution.

2. A food-warmer, comprising a box or pan having an imperforate top and also having that portion of its bottom adjacent to one of its ends covered to provide a passage for the heat of a stove when the warmer is placed thereon, the end of the box or pan adjacent to the covered portion of the bottom being provided with a series of apertures for the exit of the heat, and diagonal strips arranged within the box or pan and projecting from opposite sides thereof in advance of said perforations to compel the heat in its passage through the box or pan to follow a circuitous path to effect its thorough distribution, the free ends of said strips projecting beyond each other, whereby said strips overlap.

In testimony whereof we have signed our names to this specification in the presence of two subscribing witnesses.

WILLIAM S. BONSALL.
LE ROY C. BONSALL.

Witnesses:
EDWARD D. WADSWORTH,
BERTA S. BROWN.